April 3, 1928.
E. URBAN
1,665,183
COMBINED HOE AND RAKE
Filed April 25 1927
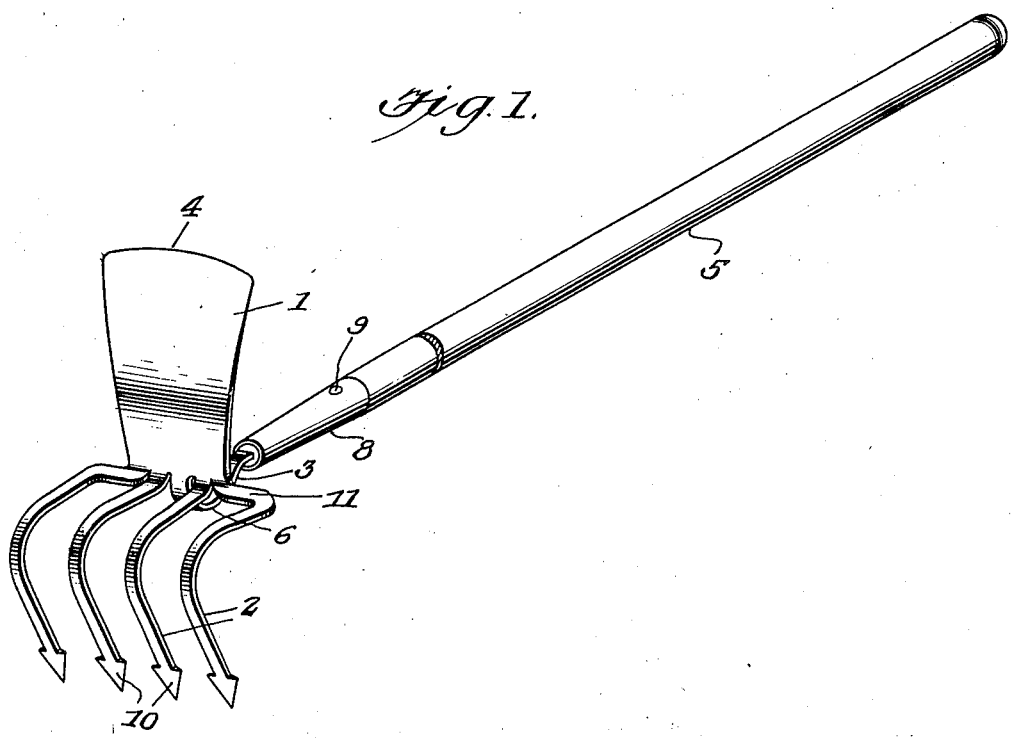
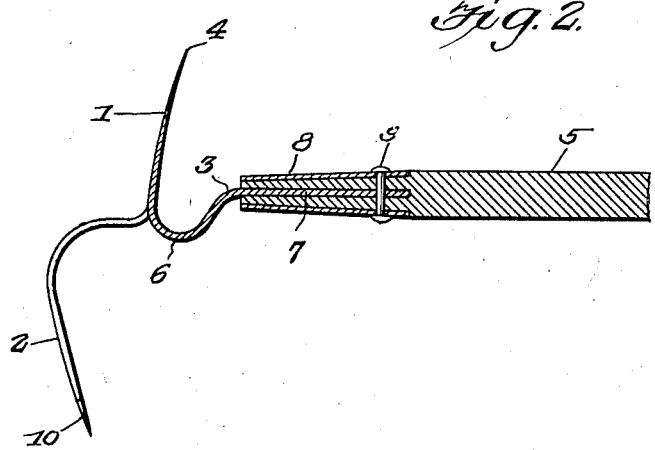
Inventor
Emil Urban,
By
Attorney Patented Apr. 3, 1928.

1,665,183

UNITED STATES PATENT OFFICE.

EMIL URBAN, OF COMSTOCK, NEBRASKA.

COMBINED HOE AND RAKE.

Application filed April 25, 1927. Serial No. 186,487.

The invention relates to a combined hoe and rake.

The object of the present invention is to provide a simple, practical and efficient garden hoe and rake of strong, durable and comparatively inexpensive construction which may be easily handled and which will be found a convenient instrument for all kinds of garden work and an excellent hoe in the South for cotton and tobacco workers.

A further object of the invention is to provide a combined garden hoe and rake of this character having the hoe blade, rake tines and shank made of a single piece of metal, thereby eliminating the use of rivets and similar fastening devices in the soil engaging portions and the bother of cleaning dirt and other accumulations from around such fastening devices, and insuring a perfectly clean tool when in use and polished for the purpose.

Another object of the invention is to provide a combined hoe and rake in which the tines will be equipped at their outer ends with enlarged sharp heads adapted in penetrating the soil to break a large opening for the body of the tine to enter and capable of effectively cutting and breaking the grass and weed roots while the same are small, thereby combining the usefulness of a hoe and soil pulverizer in the rake as well as in the hoe blade at the opposite side of the implement.

With these and other objects in view, the invention consists in the construction and novel combination and arrangement of parts hereinafter fully described, illustrated in the accompanying drawing and pointed out in the claim hereto appended, it being understood that various changes in the form, proportion and minor details of construction, within the scope of the claim, may be resorted to without departing from the spirit or sacrificing any of the advantages of the invention.

In the drawing:

Figure 1 is a perspective view of a combined garden hoe and rake constructed in accordance with this invention.

In the accompanying drawing, in which is illustrated the preferred embodiment of the invention, the combined garden hoe and rake comprises in its construction a hoe blade 1, rake tines 2 and a shank 3, all constructed of a single piece of metal of proper size and weight. The hoe blade 1 which is preferably tapered, as shown, is provided with a sharp outer transverse cutting edge 4 and is designed in practice to be approximately four inches in width at the outer cutting edge, but the dimensions of the hoe blade may be varied, as will be readily understood. The hoe blade is located beyond the adjacent end of a handle 5 in which a portion of the shank 3 is embedded and the said blade 1 is disposed approximately at right angles to the blade and terminates opposite and in spaced relation to the end of the handle 5, the shank 3 being provided with a curved portion 6 to produce this relative arrangement of the hoe blade and handle. The shank 3 consists of the curved connecting portion 6 and a straight portion 7 which is embedded in the handle. The handle is reinforced by a ferrule 8 designed to be in practice approximately five inches in length, but the length of the ferrule may, of course, be varied. The ferrule, handle, and shank are pierced near the upper end of the ferrule by a transverse rivet 9, preferably located approximately an inch from the inner or upper end of the ferrule when the implement is arranged in position for use. This provides a strong construction and eliminates any possibility of the hoe blade and rake becoming loose and separated from the handle. The handle in practice is designed to be of the usual length.

The tines are preferably four in number and the rake is designed to have approximately a six-inch spread but the number of tines and the spread of the rake may, of course, be varied. That portion of the metal between the inner pair of tines is bent approximately at right angles to the inner end of the hoe blade to form the integral shank. The tines extend outwardly approximately at right angles to the inner end of the hoe blade and are curved longitudinally to arrange the outer portions in a plane approximately at right angles to the handle. The inner pair of tines are located at opposite sides of the adjacent end of the shank and are spaced apart by the latter while the outer pair of tines are first extended laterally of the hoe blade to provide spacing arms 11 before being bent at right angles to the plane of the hoe blade. The outer portions of the tines are substantially straight and are provided with laterally enlarged approximately arrowhead shaped heads 10 which are sharpened to enable them to readily penetrate the soil and break a large opening in the same so that the body portions of the tines will easily follow the heads in penetrating the soil. Also, the sharp arrow shaped heads are adapted for cutting the roots of grass and weeds.

The garden implement is adapted to be easily handled and either the rake or the hoe blade may be instantly brought into position for use. The tool will be found efficient for all kinds of garden work, both for preparing the soil for planting and for cultivating the soil during the growth of the plants.

What is claimed is:

A combined hoe and rake including a hoe blade and rake tines extending from the inner end of the hoe blade, the said blade and tines being formed from a single piece of metal, said tines comprising spaced bars, the outer ones of which extend laterally beyond the plane of the side edges of the hoe blade and then project forwardly and downwardly to offset the rake with reference to the hoe blade, whereby a rake of greater width than the hoe blade is provided, and a shank integral with the hoe blade and rake for connection with a handle.

In testimony whereof I have hereunto set my hand.

EMIL URBAN.